(12) United States Patent
Picco et al.

(10) Patent No.: US 12,314,905 B2
(45) Date of Patent: May 27, 2025

(54) PREDICTIVE COMPUTING AND DATA ANALYTICS FOR PROJECT MANAGEMENT

(71) Applicant: INTERNATIONAL BUSINESS MACHINES CORPORATION, Armonk, NY (US)

(72) Inventors: Gabriele Picco, Dublin (IE); Natalia Mulligan, Dublin (IE); Thanh Lam Hoang, Maynooth (IE); Marco Luca Sbodio, Castaheany (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 17/658,806

(22) Filed: Apr. 11, 2022

(65) Prior Publication Data
US 2023/0325775 A1    Oct. 12, 2023

(51) Int. Cl.
*G06Q 10/30*    (2023.01)
*G06Q 10/10*    (2023.01)

(52) U.S. Cl.
CPC ........... *G06Q 10/103* (2013.01); *G06Q 10/30* (2013.01)

(58) Field of Classification Search
None
See application file for complete search history.

(56) References Cited

U.S. PATENT DOCUMENTS

| | | | |
|---|---|---|---|
| 8,560,459 B2 | 10/2013 | Bohlig | |
| 9,449,208 B2 | 9/2016 | Luk | |
| 10,911,726 B1 | 2/2021 | Skolnick | |
| 11,068,830 B2 | 7/2021 | Rodoni | |
| 11,068,860 B2 | 7/2021 | Collins et al. | |
| 11,074,556 B2 | 7/2021 | Kekalainen et al. | |
| 2009/0132394 A1 | 5/2009 | Aravamudan | |
| 2014/0379588 A1* | 12/2014 | Gates | G06T 7/0008 705/308 |
| 2016/0189094 A1 | 6/2016 | Morse | |
| 2017/0154287 A1* | 6/2017 | Kalinowski | G06Q 10/0639 |
| 2018/0075417 A1 | 3/2018 | Gordon et al. | |
| 2020/0034785 A1* | 1/2020 | Romano | B65F 1/0033 |

(Continued)

FOREIGN PATENT DOCUMENTS

| | | |
|---|---|---|
| EP | 293316 A | 11/1988 |
| WO | 2014114469 A2 | 7/2014 |
| WO | 2017175244 A1 | 10/2017 |

OTHER PUBLICATIONS

Trashbot, [online], available at: < https://web.archive.org/web/20200520121235/https://cleanrobotics.com/trashbot/ > archived on May 20, 2020 (Year: 2020).*

(Continued)

*Primary Examiner* — Richard W. Crandall
(74) *Attorney, Agent, or Firm* — Michael A. Petrocelli, Esq.; Kevin P. Radigan, Esq.; Heslin Rothenberg Farley & Mesiti P.C.

(57) ABSTRACT

Embodiments are provided for providing predictive computing and data analytics for project management in a computing system by a processor. A lifecycle of each of a plurality of objects may be monitored based on data received from a plurality of data sources. Predictive analytics for project management of each of the plurality of objects may be provide based on monitoring the lifecycle of each of the plurality of objects.

14 Claims, 7 Drawing Sheets

(56) References Cited

U.S. PATENT DOCUMENTS

| | | | |
|---|---|---|---|
| 2020/0137721 | A1 | 4/2020 | Chen et al. |
| 2020/0191580 | A1* | 6/2020 | Christensen ......... G01C 21/343 |
| 2020/0222949 | A1 | 7/2020 | Murad et al. |
| 2020/0249660 | A1* | 8/2020 | Rao ................. G05B 19/41865 |
| 2020/0286157 | A1 | 9/2020 | Ahi |
| 2020/0302377 | A1* | 9/2020 | Danducci ............... G06N 20/00 |
| 2021/0081516 | A1 | 3/2021 | Storey et al. |
| 2021/0103899 | A1* | 4/2021 | Kumar ............... G06Q 30/0201 |
| 2021/0188541 | A1 | 6/2021 | Kurani et al. |
| 2021/0217156 | A1 | 7/2021 | Balachandran et al. |

OTHER PUBLICATIONS

Bano et al., "AIoT-Based Smart Bin for Real-Time Monitoring and Management of Solid Waste", Research Article, Hindawi, Scientific Programming, vol. 2020, Article ID 6613263, https://doi.org/10.1155/2020/6613263 (13 pages).

Ferrer et al., "BIN-CT: Urban Waste Collection based on Predicting the Container Flll Level", arXiv:1807.01603v2 [cs.AI] Apr. 22, 2019, 11 pages.

Kolekar et al., "A Review on Prediction of Municipal Solid Waste Generation Models", International Conference on Solid Waste Management, 5IconSWM 2015, Elsevier, 7 pages.

Ryu et al., "Deep Neural Network Bases Demand Side Short Term Load Forecasting", Energies, MDPI, Published Dec. 22, 2016, 20 pages.

Bano et al., "AIoT-Based Smart Bin for Real-Time Monitoring and Management of Solid Waste", Research Article, Hindawi, Scientific Programming, vol. 2020, Article ID 6613263, https://doi.org/10.1155/2020/6613263 (13 pages).

Mabel Johnson, Dhanalakshmi R, "Predictive Analysis based Efficient Routing of Smart Garbage Bins for Effective Waste Management", International Journal of Recent Technology and Engineering (IJRTE), ISSN: 2277-3878, vol. 8, Issue 3, Sep. 2019, (7 pages).

Sheng et al., "An Internet of Things Based Smart Waste Management System Using LoRa and Tensorflow Deep Learning Model", IEEE Access, pp. (99):1-1, DOI:10.1109/ACCESS.2020.3016255, Aug. 2020, (19 pages).

Al-Jabi et al., "IoT-Enabled Citizen Attractive Waste Management System", 2017 2nd International Conference on the Applications of Information Technology in Developing Renewable Energy Processes & Systems (IT-DREPS), Dec. 2017, DOI:10.1109/IT-DREPS.2017.8277804, (5 pages).

Likotiko et al., "Real Time Solid Waste Monitoring Using Cloud and Sensors Technologies", The Online Journal of Science and Technology, vol. 8, Issue 1, Jan. 2018, (11 pages).

"API Integration", retrieved from web https://developers.just-eat.com/docs/api-integration, Jul. 4, 2022, 68 pages.

"Global Smart Waste Management Market 2020-2024", retrieved from web https://mms.businesswire.com/media/20200603005596/en/795827/5/IRTNTR40017.jpg?download=1, dated Apr. 11, 2025, 1 page.

Chen et al. "On-device Supermarket Product Recognition", Software Engineer, Google Research, retrieved from web https://research.google/blog/on-device-supermarket-product-recognition/, dated Apr. 11, 2025, 8 pages.

Ghosh Sagnik. "Smart IoT-Based Dustbin", hackster.io, Jul. 28, 2019, 7 pages.

Lundberg et al. "A Unified Approach to Interpreting Model Predictions", arXiv: 1705.07874v2 [cs.AI], Nov. 25, 2017, 10 pages.

Samsung. "The Industry's smartest Refrigerators", retrieved from web https://www.samsung.com/us/explore/family-hub-refrigerator/overview/, dated Apr. 11, 2025, 6 pages.

Sokol et al. "LIMEtree: Consistent and Faithful Surrogate Explanations of Multiple Classes", arXiv:2005.01427v4 [cs.LG], Feb. 26, 2025, 30 pages.

Wikipedia, "Amazon Go", retrieved from web https://en.wikipedia.org/wiki/Amazon Go, dated Apr. 11, 2025, 7 pages.

\* cited by examiner

BIN LEVEL/COMPOSITION PREDICTION
(WEEK 11)

GLASS BIN: 107(±8)%

|  | Wed | Thu | Fri | Sat | Sun |
|---|---|---|---|---|---|
| JUICE BOTTLES | 42% | 47% | 56% | 72% | 62% |
| MILK JUGS | 5% | 12% | 15% | 16% | 18% |
| | ... | ... | ... | ... | ... |
| TOTAL | 66% | 70% | 13% | 99% | 107% |

*GLASS BIN*: 84(±5)%

|  | Wed | Thu | Fri | Sat | Sun |
|---|---|---|---|---|---|
| PACKAGING | 42% | 47% | 56% | 72% | 69% |
| PAPERS | 1% | 1% | 1% | 5% | 5% |
| | ... | ... | ... | ... | ... |
| TOTAL | 47% | 51% | 53% | 80% | 84% |

*ORGANIC BIN*: 82(±18)%

|  | Wed | Thu | Fri | Sat | Sun |
|---|---|---|---|---|---|
| FRUITS | 12% | 13% | 15% | 32% | 42% |
| VEGETABLES | 12% | 15% | 17% | 30% | 35% |
| | ... | ... | ... | ... | ... |
| TOTAL | 42% | 47% | 56% | 72% | 82% |

PREDICTIVE COMPUTING AND DATA ANALYTICS FOR PROJECT MANAGEMENT

BACKGROUND

The present invention relates in general to computing systems, and more particularly, to various embodiments for providing predictive computing and data analytics for project management using a computing processor.

SUMMARY

According to an embodiment of the present invention, a method providing predictive computing and data analytics for project management in a computing environment, by one or more processors, in a computing system. A lifecycle of each of a plurality of objects may be monitored based on data received from a plurality of data sources. Predictive analytics for project management of each of the plurality of objects may be provide based on monitoring the lifecycle of each of the plurality of objects.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, an IoT device may be used to improve the operations and management of various environmental conditions such as, for example, waste management. Moreover, the IoT device may even be employed to monitor, track, and predict various activities of daily living such as, for example, management of consumer goods and services and, more specifically, monitoring and tracking the life cycle of consumer goods and services particularly as they relate to various users. In other areas, the IoT device may be used to assist with operations and management of available data that impacts, both directly and indirectly, the overall health and wellness of a person. Thus, IoT devices may be applicable for use in a variety of scenarios and applications to provide predictive computing and data analytics as described herein.

Moreover, the advent of immediate, real-time communication made possible by smartphones and other IoT devices, enable various user to share communication and/or data (e.g., media files). For example, the proliferation of various peer-to-peer or data filing sharing applications (e.g., social media applications) provide solutions for users to communicate messages and files.

In one aspect, efficient management of waste of both industrial and domestic is a significant challenge for the environment and for the cities/metropolitan areas around the world. Forecasts predict that a total volume of municipal waste is likely to increase over the next fifteen years, necessitating future investment in waste management infrastructure. Thus, the total volume of waste increase, the greater the need for providing increase waste management.

Accordingly, in some implementations, a smart project management (e.g., waste management) may be provided for lifecycle and monitoring of products including disposal using one or more artificial intelligent ("AI") or "smart" bins (e.g., a waste receptacle) having one or more sensors placed in waste receptacles to identify waste, measure fill levels and to notify city collection services when bins are ready to be emptied. Over time, historical data collected by sensors of the waste receptacles can be used to identify waste fill patterns, optimize waste/trash collection driver routes and schedules, and reduce operational costs. In one aspect, the smart project management (e.g., waste management) system may predict average (e.g., regular patterns) but while also considering additional or unusual (non-repeatable or infrequent) events such as, for example, house parties, visiting guests etc.

In some implementations, the present invention provides an intelligent system for providing lifecycle and monitoring of products including disposal and predictive computing and data analytics for project management (e.g., waste management) by combining smart home and smart waste devices to provide agile and accurate waste prediction, planning and management system (e.g., using cloud analytics and application programming interfaces ("APIs")). The present invention may provide active monitoring of products lifecycle, which enables waste prediction based on regular and/or atypical products usage/consumption patterns. The present invention may provide for increased efficiency of waste management by building enhanced, cloud-based predictive analytics through active monitoring of products lifestyle. A lifecycle of each of a plurality of objects (e.g., product lifestyles) may be monitored based on data received from a plurality of data sources. Predictive analytics for project management (e.g., waste management) of each of the plurality of objects may be provide based on monitoring the lifecycle of each of the plurality of objects.

It should be noted as described herein, the term "intelligent" (or "cognitive/cognition") may be relating to, being, or involving conscious intellectual activity such as, for example, thinking, reasoning, or remembering, that may be performed using a machine learning. In an additional aspect, cognitive or "intelligent may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "intelligent" may refer to a mental action or process of acquiring knowledge and understanding through thought, experience, and one or more senses using machine learning (which may include using sensor-based devices or other computing systems that include audio or video devices). Cognitive/intelligent may also refer to identifying patterns of behavior, leading to a "learning" of one or more events, operations, or processes. Thus, the intelligent model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term intelligent may refer to an intelligent system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. An intelligent system may use AI logic, such as NLP based logic, for example, and machine learning logic, which may be provided as specialized hardware, software executed on hardware, or any combination of specialized hardware and software executed on hardware. The logic of the intelligent system may implement the intelligent operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and intelligent; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human intelligent based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
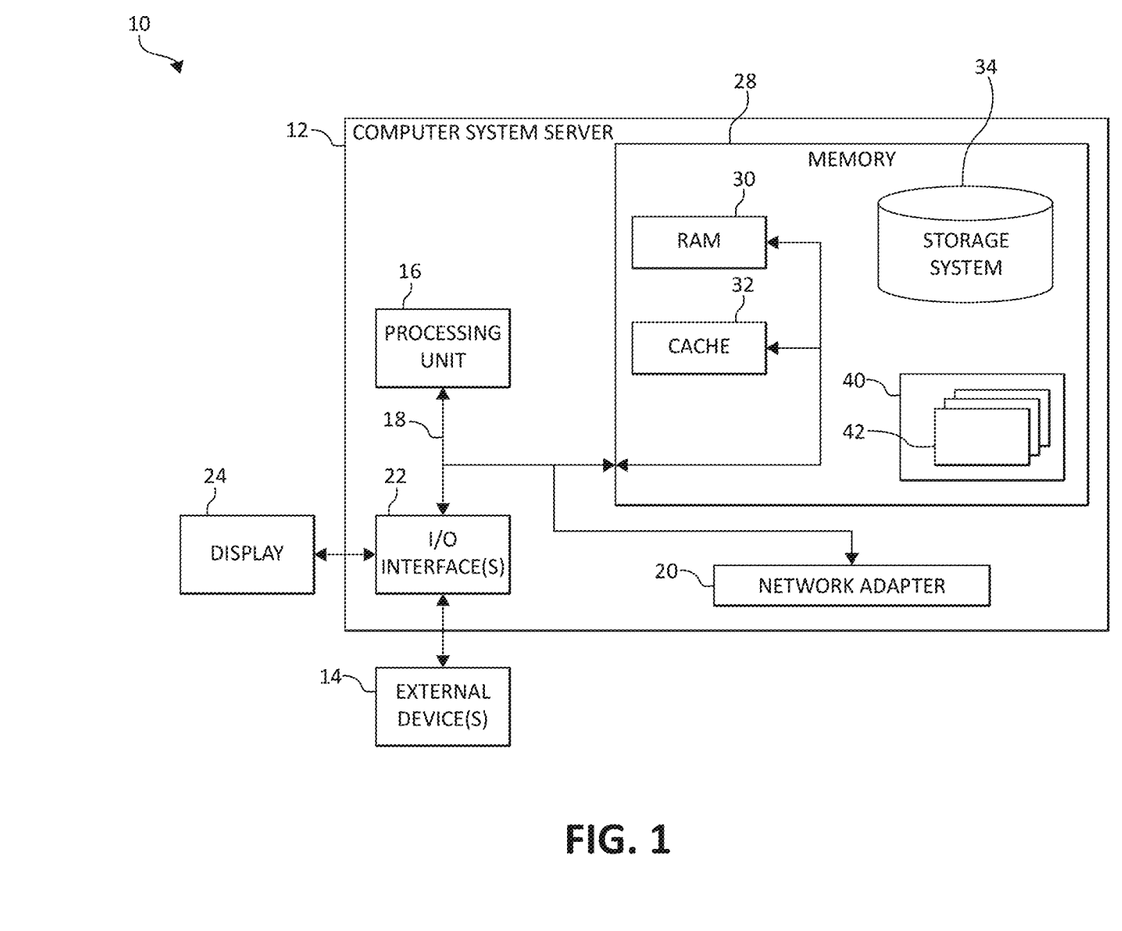
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
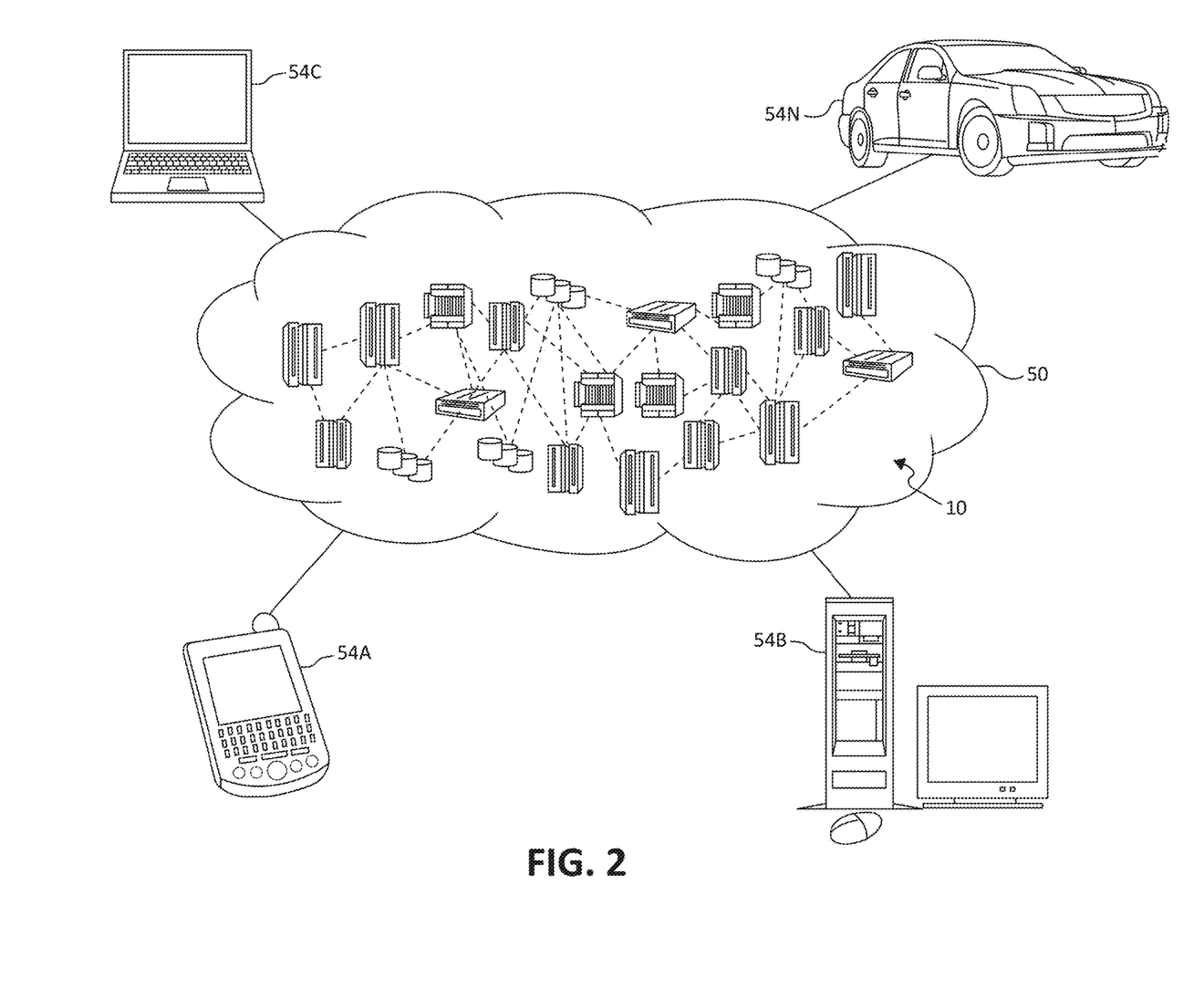
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
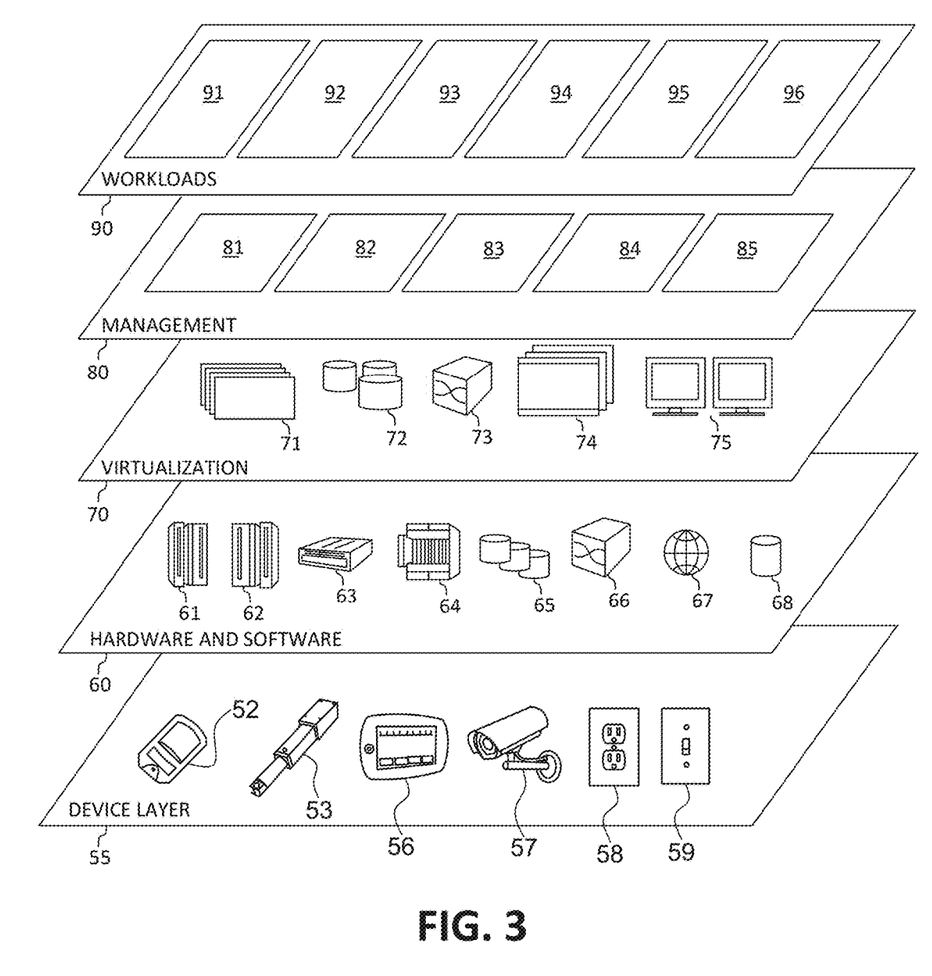
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing predictive computing and data analytics for project management (e.g., waste management). In addition, workloads and functions 96 for providing predictive computing and data analytics for project management (e.g., waste management) may include such operations as data analytics, data analysis, and as will be further described, notification functionality. One of ordinary skill in the art will appreciate that workloads and functions 96 for providing predictive computing and data analytics for project management (e.g., waste management) may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Thus, as previously mentioned, the present invention provides novel solutions for building an enhanced, cloud-based predictive analytics for efficient project management (e.g., waste management) by monitoring products lifecycle. The products lifecycle include stages such as order, delivery, storage, usage, disposal, and the like. The present invention monitors each of the products lifecycle by fusing data coming from different data sources including, for example, cloud APIs for products ordering/delivery.

In other implementations, IoT devices such as sensors and video-cameras installed at a location where products are used/stored (for example household, shop, office, commercial venue, etc.). The IoT devices such as, for example, sensors and video-cameras installed at a location where waste is accumulated (typically waste bins at a household, shop, office, etc.) The present invention provides for detecting from the products lifecycle regular and/or atypical products usage/consumption patterns at the location, and using such patterns to compute predictions of waste levels at the location (household, shop, office, commercial venue etc.). The present invention provides for producing as output a report with the predicted filling levels of the bins at future time intervals (waste report), and a report with the predicted usage patterns of products at future time intervals (usage reports). The present invention provides for exposing cloud-based APIs to retrieve the outputs.

Figure 4A:
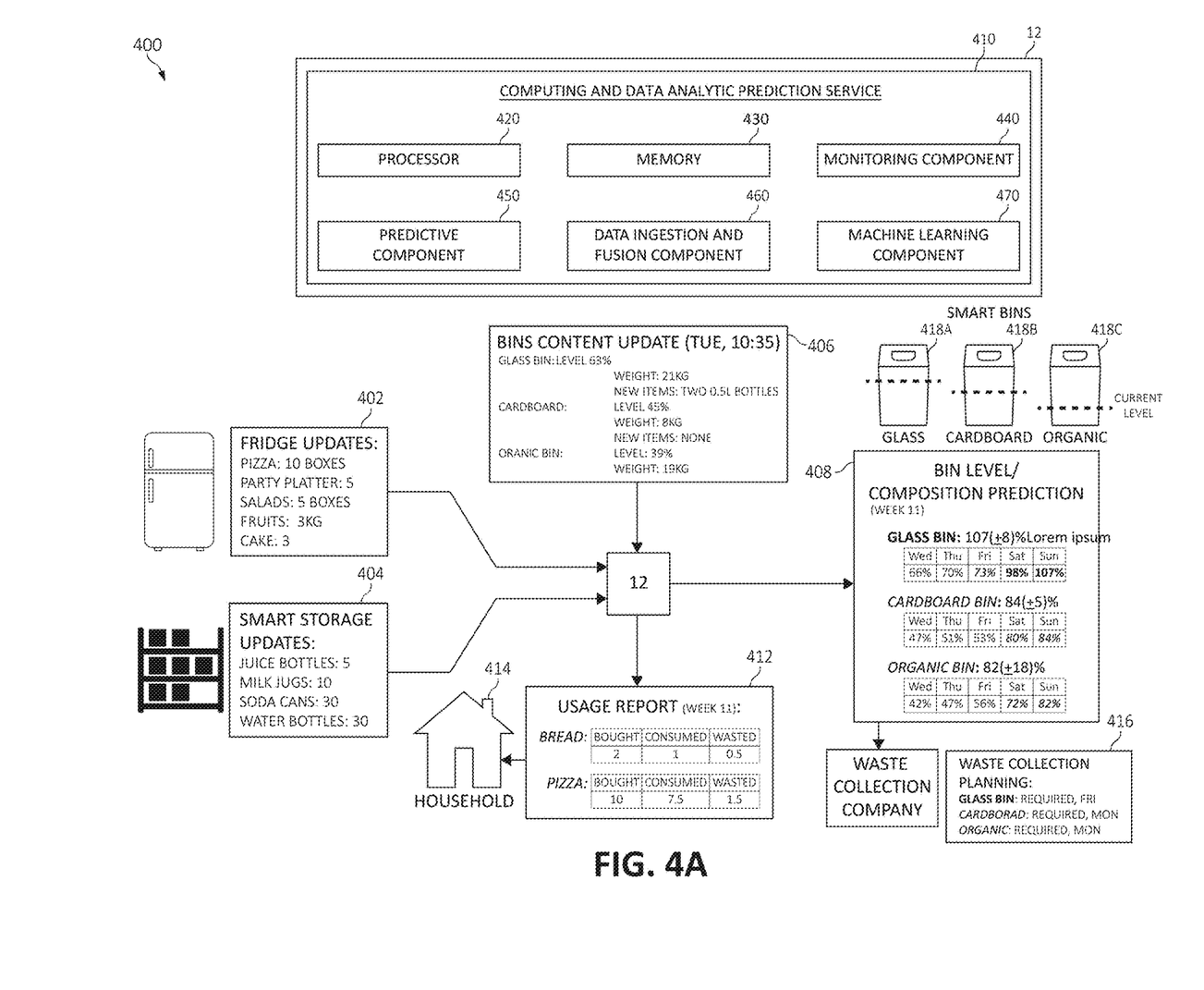
FIG. 4A is an additional block diagram for providing predictive computing and data analytics for project management according to an embodiment of the present invention.
Figure 4B:
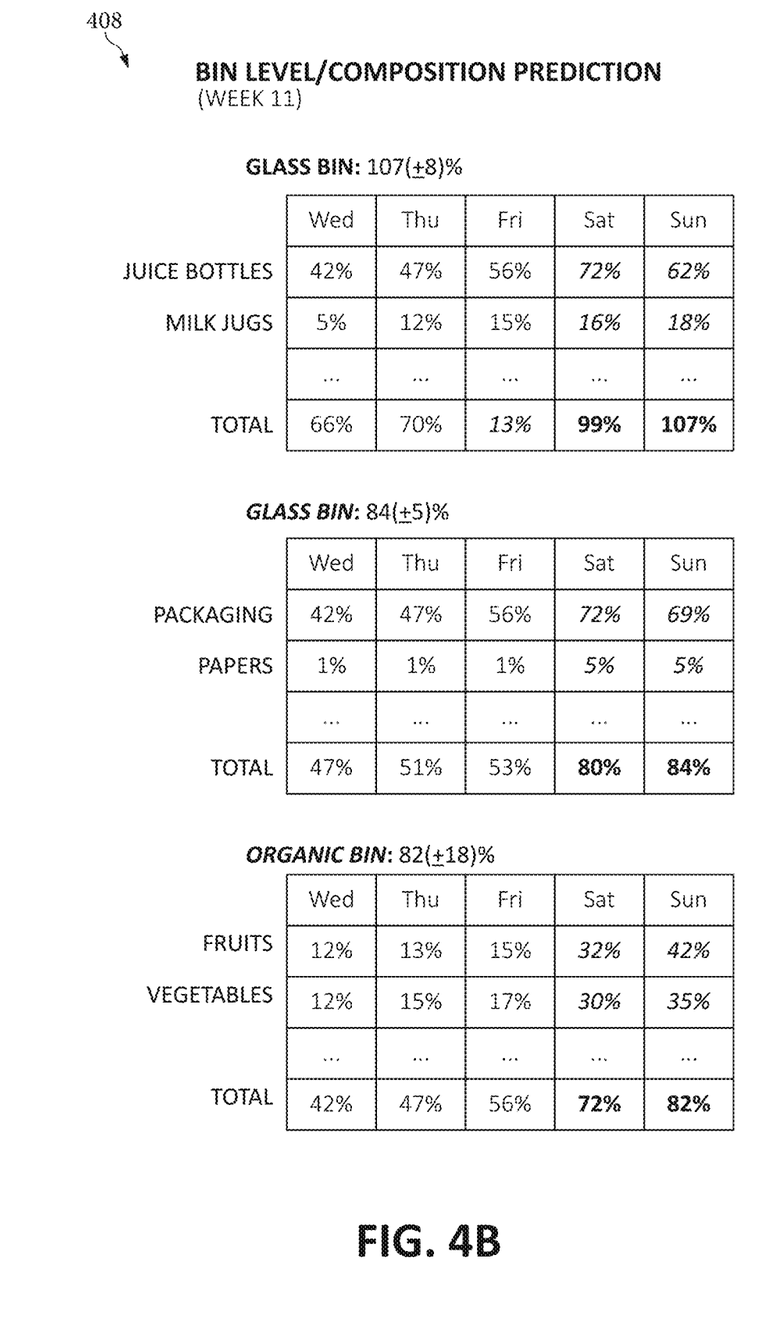
FIG. 4B is a diagram of waste level consumptions predictions of waste containers according to an embodiment of the present invention.

Turning now to FIG. 4A, a block diagram depicting exemplary functional components of system 400 for providing predictive computing and data analytics for project management (e.g., waste management) in a computing environment according to various mechanisms of the illustrated embodiments is shown. Also, FIG. 4B is a diagram of waste level consumptions predictions 408 of waste containers. In one aspect, one or more of the components, modules, services, applications, and/or functions described in FIGS. 1-3 may be used in FIGS. 4A-4B. As will be seen, many of the functional blocks may also be considered "modules" or "components" of functionality, in the same descriptive sense as has been previously described in FIGS. 1-3.

A computing and data analytic prediction service 410 (which may be a waste management service) is shown, incorporating processing unit 420 ("processor") to perform various computational, data processing and other functionality in accordance with various aspects of the present invention. In one aspect, the processor 420 and memory 430 may be internal and/or external to the computing and data analytic prediction service 410, and internal and/or external to the computing system/server 12. The computing and data analytic prediction service 410 may be included and/or external to the computer system/server 12, as described in FIG. 1. The processing unit 420 may be in communication with the memory 430. The computing and data analytic prediction service 410 may include a monitoring component 440, a predictive component 450, a data ingestion and fusion component 460, and a machine learning component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In some embodiments, the computing and data analytic prediction service 410 of the computer system/server 12 may be in communication with one or more data source such as, for example, an appliance 402 (e.g., a refrigerator), a storage device 404 (e.g., smart storage), one or more waste containers 418A-C (e.g., a waste bin that may include one or more an Internet of Things (IoT) devices/sensors), and/or contents updates 406 for more waste containers 418A-C and/or smart storage 402 and 404.

In one aspect, the computing and data analytic prediction service 410 of the computer system/server 12 may receive, identify, and/or select data from the appliance 402 (e.g., a refrigerator), smart storage updates 404, the waste containers 418A-C (e.g., smart bins), and/or contents updates 406 for the waste containers 418A-C and/or the smart storage 402 and 404. For example, the appliance 402 (e.g., a refrigerator) may provide to the computing and data analytic prediction service 410 one or more updates indicating a number of various products (e.g., pizza, party platters, salads, fruits, cakes, etc.) contain therein along with continuous product updates collected as the bin contents updates 406.

In some implementations, the computing and data analytic prediction service 410 may monitor a lifecycle of each of a plurality of objects (e.g., the products associated with the appliance 402 (e.g., a refrigerator), the smart storage updates 404, and/or the waste containers 418A-C (e.g., smart bins) based on data received from a plurality of data sources (e.g., the appliance 402 (e.g., a refrigerator), the storage device 404, and/or the waste containers 418A-C (e.g., smart bins)) and provide predictive analytics 408 (e.g., bin level/composition prediction) for waste management of each of the plurality of objects based on monitoring the lifecycle of each of the plurality of objects.

It should be noted that the predictive analytics 408 are more clearly depicted in FIG. 4B where the bins level composition prediction includes the percentages of the types of waste in the bins at a specific time. For example, the predictive analytics 408 (e.g., bin level/composition prediction) may provide, for example, predictive analytics that predicts bin levels such as, for example, a composition prediction for a period of time (e.g., days of the week) with a percentage indicating a bin level (e.g., predictive analytics illustrating, for example, 66% on Wednesday, 70% on Thursday, 13% on Friday, 99% on Saturday and 107% on Sunday for a glass bin of juice bottles, milk jugs, etc.). The predictive analytics 408 analytics may be used by a waste collection company for waste collection planning 416.

The computing and data analytic prediction service 410 may also identify each stage of the lifecycle of each of a plurality of objects. The computing and data analytic prediction service 410 may collect data from one or more of the plurality of data sources for monitoring the lifecycle of each of the plurality of objects/products. The computing and data analytic prediction service 410 may learn one or more features, characteristics consumption patterns of each of the plurality of objects.

The computing and data analytic prediction service 410 may enhance one or more features of each of the plurality of objects using data from one or more of the plurality of data sources. The computing and data analytic prediction service

410 may predict usage patterns and waste levels of each of a plurality of waste containers (e.g., the waste containers 418A-C) based on monitoring each stage of the lifecycle of each of the plurality of objects (e.g., smart storage is one of the data sources the system may use to monitor life cycles of the plurality of objects).

The computing and data analytic prediction service 410 may also initialize a machine learning mechanism using data collected from the one or more Internet of Things (IoT) sensors (which may be associated with the appliance 402 and/or the waste containers 418A-C) to provide predictive analytics for waste management of each of the plurality of objects.

The computing and data analytic prediction service 410 may also provide a usage report of each of the plurality of objects (e.g., products such as, for example, bread, pizza, etc.) indicating the amount purchased (bought), consumed, and/or wasted.

In one aspect, the machine learning component 470 as described herein, may perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5:
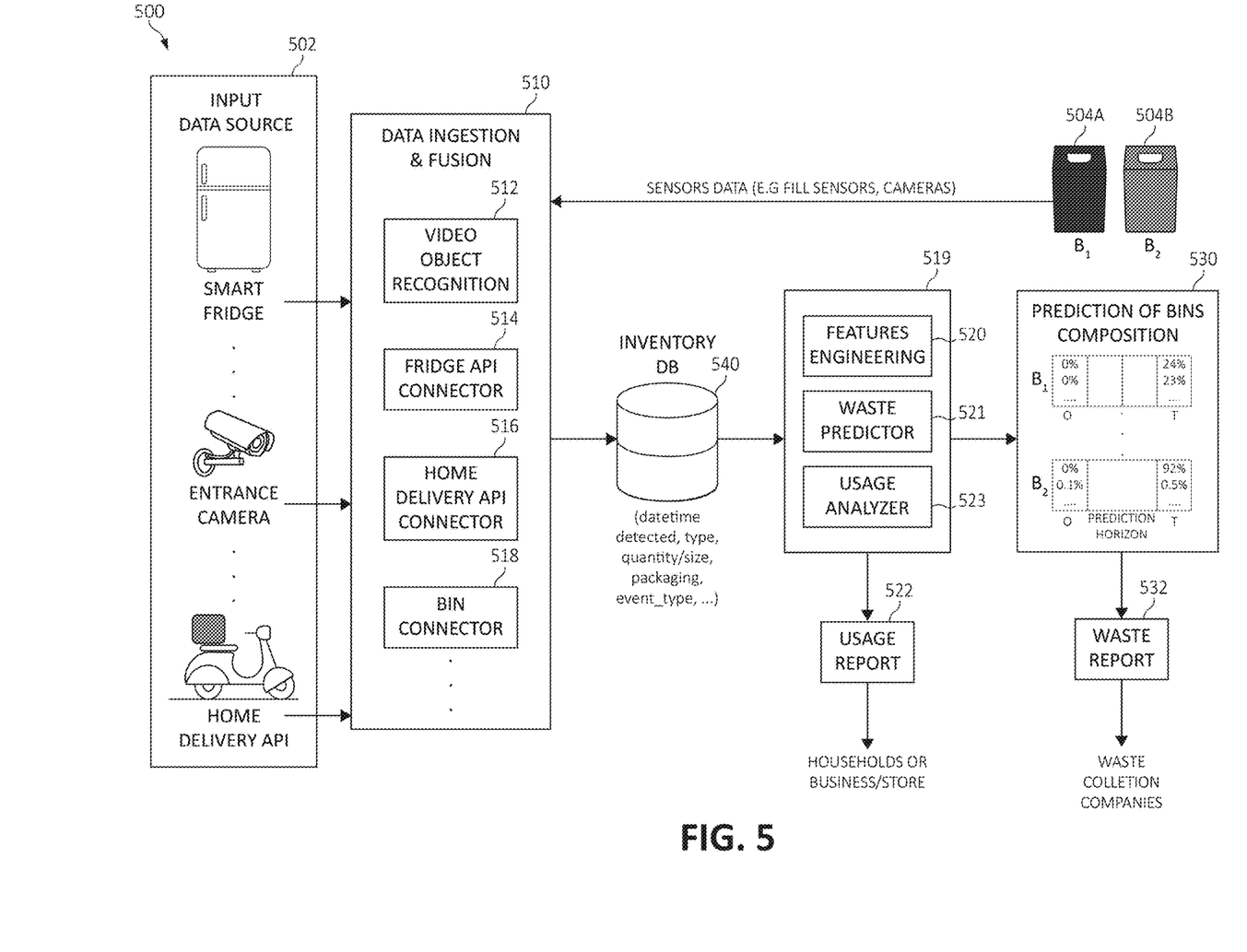
FIG. 5 is an additional block diagram depicting an exemplary operations for providing predictive computing and data analytics for project management according to an embodiment of the present invention in which aspects of the present invention may be realized.

Turning now to FIG. 5, a block diagram depicts a system 500 in a computing environment for providing computing and data analytic prediction service 410 and enhanced data allocation for machine learning operations in a cloud computing system. In one aspect, one or more of the components, modules, services, applications, and/or functions described in FIGS. 1-4 may be used in FIG. 5. As shown, various blocks of functionality are depicted with arrows designating the blocks' of system 500 relationships with each other and to show process flow (e.g., steps or operations). Additionally, descriptive information is also seen relating each of the functional blocks' of system 500. As will be seen, many of the functional blocks may also be considered "modules" of functionality, in the same descriptive sense as has been previously described in FIGS. 1-4. With the foregoing in mind, the module blocks' of system 500 may also be incorporated into various hardware and software components of a system for automated evaluation of machine learning models in a computing environment in accordance with the present invention. Many of the functional blocks of system 500 may execute as background processes on various components, either in distributed computing components, or elsewhere.

Staring in block 502, a data ingestion and fusion component 510 ingests products data from different input sources. For example, an input data source 502 (e.g., smart appliances/IoT devices such as for example, a smart refrigerator, a camera, and/or home delivery API) may communicate and provide data to a data ingestion and fusion component 510. Additionally, one or more smart waste receptacles such as, for example smart bins 504A ("B1"), 504B ("B2") may include one or more sensors and communicate the sensor data (e.g., fill sensors, cameras) to the data ingestion and fusion component 510.

Data can be acquired from devices (e.g., the input data source 502) such as, for example, a smart fridge, a video camera positioned at the entrance, various other IoT devices, software sources (e.g., an API of a home delivery service), etc. In some implementation, the data ingestion and fusion component 510 may include one or more internal sub-components (e.g., video object recognition component 512 to detect video and objects, a smart appliance API connector such as, for example, a refrigerator API connector 514, a home delivery API connector 516, and/or a waste bin connector 518). The one or more internal sub-components of the data ingestion and fusion component 510 may convert the data coming from the input data source 502 and/or smart bins 504A, 504B in a uniform/standardized format, which is saved in a database such as, for example an inventory database ("DB") 540 (e.g., containing type of product, quantity/size, packaging, timestamp, event type: acquisition|leaving the fridge|home delivered|trashed|etc.).

In other implementations, the data ingestion and fusion component 510 can enrich product features using additional external information (e.g., packaging derived from an online catalog). For example, the data ingestion and fusion component 510 may receive as input data from one or more input data source 502 including a smart fridge, video cameras, RFID readers, IoT devices, cloud-based APIs (product ordering, delivery, etc.), smart bins 504A, 504B and provide as output data transformed into a uniform format, which may be stored in the database 540.

In other implementations, one or more of the sub-components of the data ingestion and fusion component 510 can be a video object recognition 512 ("VOR") that acquires data from a video stream and identifies products and characteristics such as quantity/size and packaging. The VOR 512 can be implemented using one or more product recognition operations such as, for example, "On-device Supermarket Product Recognition."

The fridge API connector 514 may also convert the results obtained from a fridge API (e.g., ACME smart fridge) to the uniform format used in the database 540.

The home delivery API connector 518 may convert the results obtained from a Home Delivery API (e.g., ACME delivery service API) to the uniform format used in the database 540.

The bin connector 518 may convert product information received from the smart bins 504A, 504B (e.g., Smart IoT-Based Dustbin) to the uniform format used in the database 540. The data ingestion and fusion component 510 subsequently postprocesses the extracted data and performs cleaning and normalization operations, such as removing duplicate products (e.g., acquired from multiple sources).

In addition to these functions, bin connector 518 may perform inventory amendment changing product state (e.g., position in life cycle). It is referred as "event type (e.g., entering the fridge|leaving the fridge|acquired|trashed|etc.) ". In addition, it may be possible to record even more fine-grained details monitoring what products were wasted and what products were consumed (e.g., tuna tin can from "unopened" to "consumed" or from "opened" to "wasted" or from "nearly out of date" to "wasted").

A centralized component 519 may be in communication with and also access the database 540. In some implementations, the centralized component 519 may include a feature engineering component 520, a waster predictor 521, and a usage analyzer 523.

In some implementations, the feature engineering component 520 may be responsible for generating aggregated features useful for the waste predictor 521 and the usage analyzer 523 associated with the feature engineering component 520 and the centralized component 519. One or more features can be aggregated by dimensions such as, for example, product type, input source or timestamp. One of the aggregated data generated by the feature engineering component 520 is the bins composition, which is a percentage of the types of waste in the smart bins 504A, 504B at a specific time (e.g., glass bin: bottles of wine 1%, beers 3%, broken glass 0.2%).

The waste predictor 521 is a component of the centralized component 519 that is responsible for predicting the bins composition of one or more smart bins 504A, 504B at future times. The waste predictor 521 may receive as input collections of registered products, with features such a type, size/quantity, timestamp and event type (e.g., entering the fridge|leaving the fridge|acquired|trashed|etc.) aggregated features output from the feature engineering component (e.g., the bins composition used as target prediction). The output of the waste predictor 521 may be predicted bins composition 530 of one or more smart bins 504A, 504B at future time intervals.

The predicted bins composition 530 are the percentages of the types of waste in the smart bins 504A, 504B (e.g., glass bin: bottles of beverage A 1%, beverage B 3%, broken glass 0.2%). In some implementations, the predicted bins composition 530 may be from one or more time series regression models (e.g., one for every bin) that projects the bins composition in a future time. The predicted bins composition 530 learns from the bin composition history (e.g., recorded by the bin sensors). Over time, a machine learning model of the predicted bins composition 530 may learn complex patterns between purchasing/usage habits (products lifecycle), consumption and production of waste.

A waste report 532 of the predicted bins composition 530 of the bins at future time intervals may be provided to waste collection companies through a generated report or an API. The waste collection companies are enabled to further aggregate predictions for multiple houses/offices (e.g., in the same neighborhood) to optimize the waste collection.

A usage analyzer 523 of the centralized component 519 may be responsible for observing consumer/waste relationship in order to provide spending and garbage optimization suggestions (e.g., a usage report 522). In some implementations, the usage analyzer 523 can be implemented using recorded products or food not consumed, (from the inventory DB 540 and the usage analyzer component) that ended up in the trash, for training a prediction model and subsequently applying an operation for generating an explanation. The model is trained to predict the waste from the input features of the wasted products. A model agnostic explanation method is applied in order to provide explanation for the waste and therefore waste/spending suggestions.

Figure 6:
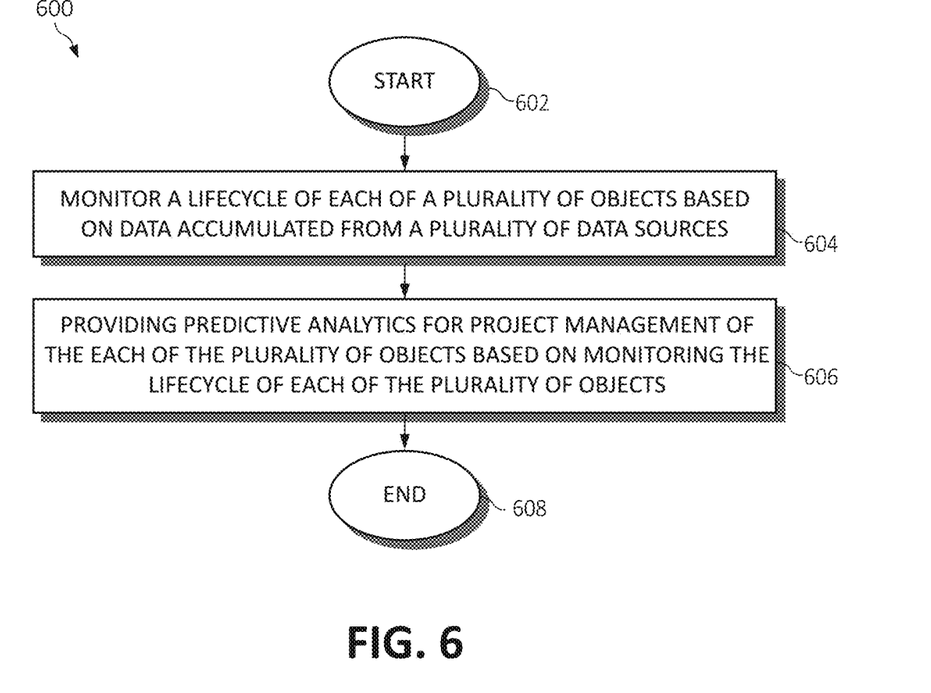
FIG. 6 is a flowchart diagram depicting an exemplary method for providing predictive computing and data analytics for project management by a processor, again in which aspects of the present invention may be realized.

Turning now to FIG. 6, a method 600 for providing predictive computing and data analytics for project management (e.g., waste management) by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. As one of ordinary skill in the art will appreciate, the various steps depicted in method 800 may be completed in an order or version differing from the depicted embodiment to suit a particular scenario. The functionality 600 may start in block 602.

A lifecycle of each of a plurality of objects may be monitored based on data received from a plurality of data sources, as in block 604. Predictive analytics for project management (e.g., waste management) of each of the plurality of objects may be provided based on monitoring the lifecycle of each of the plurality of objects, as in block 606. The functionality 600 may end in block 608.

In one aspect, in conjunction with and/or as part of at least one block of FIG. 6, the operations of method 600 may include each of the following. The operations of method 600 may identify each stage of the lifecycle of each of a plurality of objects. The operations of method 600 may collect data from one or more of the plurality of data sources for monitoring the lifecycle of each of the plurality of objects, and/or learn one or more features, characteristics consumption patterns of each of the plurality of objects.

The operations of method 600 may enhance one or more features of each of the plurality of objects using data from one or more of the plurality of data sources. The operations of method 600 may predict usage patterns and waste levels of each of a plurality of waste containers based on monitoring each stage of the lifecycle of each of the plurality of objects.

The operations of method 600 may initialize a machine learning mechanism using data collected from the one or more Internet of Things (IoT) sensors to provide predictive analytics for project management (e.g., waste management) of each of the plurality of objects.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A computer-implemented method of facilitating predictive computing and data analytics within a computing system in a computing environment, the computer-implemented method, comprising:

training, via a machine learning component, a machine learning model using data collected over time from one or more Internet of Things (IoT) sensors associated with at least one container to contain objects of a plurality of objects, the at least one container comprising at least one smart bin for a respective material class and the plurality of objects being a plurality of objects of the respective material class, the machine learning model to provide predictive analytics for the plurality of objects related to predicting percentage composition of objects within the at least one container based on object type, the objects within the at least one container including different types of objects, wherein the machine learning model is associated with one or more application programming interfaces ("API") to collect the data from the one or more IoT sensors;

receiving, across a network of the computing environment, data from a plurality of data sources to electronically monitor, based on the data received from the plurality of data sources, a lifecycle of one or more objects of the plurality of objects, the plurality of data sources including the at least one smart bin and the at least one smart bin including at least one Internet of Things (IoT) device associated therewith generating, at least in part, the data from the plurality of sources; and executing a predictive component to provide predictive analytics related to the plurality of objects, based on the monitored lifecycle of the one or more objects of the plurality of objects, wherein the predictive analytics includes a predicted percentage composition of the objects within the at least one container based on object type.

2. The computer-implemented method of claim 1, further including identifying each stage of the lifecycle of each of a plurality of objects.

3. The computer-implemented method of claim 1, further including collecting data from one or more of the plurality of data sources for monitoring the lifecycle of each of the plurality of objects.

4. The computer-implemented method of claim 1, further including learning one or more features, characteristics, or consumption patterns of each of the plurality of objects.

5. The computer-implemented method of claim 1, further including enhancing one or more features of each of the plurality of objects using data from one or more of the plurality of data sources.

6. A computer system for facilitating predictive computing and data analytics within a computing environment, the computer system comprising:
one or more computers with executable instructions that when executed cause the computer system to:
training, via a machine learning component, a machine learning model using data collected over time from one or more Internet of Things (IoT) sensors associated with at least one container to contain objects of a plurality of objects, the at least one container comprising at least one smart bin for a respective material class and the plurality of objects being a plurality of objects of the respective material class, the machine learning model to provide predictive analytics for the plurality of objects related to predicting percentage composition of objects within the at least one container based on object type, the objects within the at least one container including different types of objects, wherein the machine learning model is associated with one or more application programming interfaces ("API") to collect the data from the one or more IoT sensors;
receiving, across a network of the computing environment, data from a plurality of data sources to electronically monitor, based on the data received from the plurality of data sources, a lifecycle of one or more objects of the plurality of objects, the plurality of data sources including the at least one smart bin and the at least one smart bin including at least one Internet of Things (IoT) device associated therewith generating, at least in part, the data from the plurality of sources; and
executing a predictive component to provide predictive analytics related to the plurality of objects, based on the monitored lifecycle of the one or more objects of the plurality of objects, wherein the predictive analytics includes a predicted percentage composition of the objects within the at least one container based on object type.

7. The computer system of claim 6, wherein the executable instructions when executed cause the system to identify each stage of the lifecycle of each of a plurality of objects.

8. The computer system of claim 6, wherein the executable instructions when executed cause the system to collect data from one or more of the plurality of data sources for monitoring the lifecycle of each of the plurality of objects.

9. The computer system of claim 6, wherein the executable instructions when executed cause the system to learn one or more features, characteristics, or consumption patterns of each of the plurality of objects.

10. The computer system of claim 6, wherein the executable instructions when executed cause the system to enhance one or more features of each of the plurality of objects using data from one or more of the plurality of data sources.

11. A computer program product for facilitating predictive computing and data analytics within a computing environment, the computer program product comprising:
one or more computer readable storage media, and program instructions collectively stored on the one or more computer readable storage media, for causing at least one processor to perform computer operations comprising:
training, via a machine learning component, a machine learning model using data collected over time from one or more Internet of Things (IoT) sensors associated with at least one container to contain objects of a plurality of objects, the at least one container comprising at least one smart bin for a respective material class and the plurality of objects being a plurality of objects of the respective material class, the machine learning model to provide predictive analytics for the plurality of objects related to predicting percentage composition of objects within the at least one container based on object type, the objects within the at least one container including different types of objects, wherein the machine learning model is associated with one or more application programming interfaces ("API") to collect the data from the one or more IoT sensors;
receiving, across a network of the computing environment, data from a plurality of data sources to electronically monitor, based on the data received from the plurality of data sources, a lifecycle of one or more objects of the plurality of objects, the plurality of data sources including the at least one smart bin and the at least one smart bin including at least one Internet of Things (IoT) device associated therewith generating, at least in part, the data from the plurality of sources; and
executing a predictive component to provide predictive analytics related to the plurality of objects, based on the monitored lifecycle of the one or more objects of the plurality of objects, wherein the predictive analytics includes a predicted percentage composition of the objects within the at least one container based on object type.

12. The computer program product of claim 11, further including program instructions to identify each stage of the lifecycle of each of a plurality of objects.

13. The computer program product of claim 11, further including program instructions to:
- collect data from one or more of the plurality of data sources for monitoring the lifecycle of each of the plurality of objects; and
- learn one or more features, characteristics, or consumption patterns of each of the plurality of objects.

14. The computer program product of claim 11, further including program instructions to enhance one or more features of each of the plurality of objects using data from one or more of the plurality of data sources.

* * * * *